United States Patent [19]

Cantor et al.

[11] 3,932,559

[45] Jan. 13, 1976

[54] ADHESION OF OLEFIN COPOLYMER RUBBER TO NYLON TEXTILE

[75] Inventors: Stephen E. Cantor, Cheshire; Arthur A. Blaskiewicz, Danbury, both of Conn.

[73] Assignee: Uniroyal Inc., New York, N.Y.

[22] Filed: Jan. 25, 1974

[21] Appl. No.: 436,416

[52] U.S. Cl. .............. 260/847; 156/333; 156/335; 260/32.8 A; 260/33.6 A; 260/848; 428/474; 428/506
[51] Int. Cl.² .................. C08L 61/06; C08L 23/28
[58] Field of Search ...................................... 260/847

[56] References Cited
UNITED STATES PATENTS

| | | | |
|---|---|---|---|
| 2,459,739 | 1/1949 | Groten et al. | 260/847 |
| 2,822,026 | 2/1958 | Willis | 260/847 |
| 2,857,357 | 10/1958 | Smith | 260/847 |
| 3,366,508 | 1/1968 | Gallagher | 260/847 |
| 3,502,603 | 3/1970 | Gallagher et al. | 260/847 |

*Primary Examiner*—John C. Bleutge
*Attorney, Agent, or Firm*—James J. Long

[57] ABSTRACT

Halogenated olefin copolymer rubber, particularly halogenated EPDM (prepared by heating the rubber in admixture with an N-haloamide [e.g., 1,3-dichloro-5,5-dimethyl hydantoin or N,N'-dichloro-p-toluene sulfonamide]) is blended with curatives (sulfur, accelerator) and a resorcinol-aldehyde condensation product in which the aldehyde has 2–4 carbon atoms (e.g., acetaldehyde) to make a vulcanizable adhesive for nylon textile. Nylon fabric coated with the composition is useful for making air bags (passive restraints for automotive vehicles). The adhesive is also useful for making nylon-reinforced tires, hose, etc.

8 Claims, No Drawings

ADHESION OF OLEFIN COPOLYMER RUBBER TO NYLON TEXTILE

This invention relates to an adhesive composition comprising a halogenated olefin copolymer rubber, and to a method of adhering such rubber to nylon textile, as well as to a laminate resulting from such method.

The addition of certain resorcinol donors along with certain methylene donors to vulcanizable rubber stocks to improve adhesion to textiles is known (e.g., U.S. Pat. No. 3,266,970, Paul, Aug. 16, 1966).

The halogenation of EPDM has been described (R. T. Morrissey, Rubber Chem. and Tech. 44, No. 4, 1025 [1971]). Additions of natural rubber and SBR to halogenated EPDM are said to enable these mixtures to be adhered to steel using a commercial rubber-to-metal adhesive (R. T. Morrissey, ibid.).

The use of a latex of halogenated or chlorosulfonated EPDM rubber containing resorcinol-formaldehyde resin as an adhesive for bonding textiles to olefin copolymer rubber has been disclosed (U.S. Pat. No. 3,577,310, Torti et al., May 4, 1971). Further prior practices are represented by U.S. Pat. Nos. 3,367,827, Gallagher, Feb. 6, 1968, 3,528,943, Goldberg et al,. Sept. 15, 1970, 3,632,671, Furukawa et al., Jan. 4, 1972, and 3,657,046, Furukawa et al., Apr. 18, 1972.

Unfortunately, prior methods for adhering olefin copolymer rubber to nylon textile reinforcement have not proven to be entirely satisfactory. The invention is based on the discovery that a vulcanizable composition comprising halogenated olefin copolymer rubber, curatives and a resorcinol-alkyl aldehyde condensation product in which the aldehyde has from 2 to 4 carbon atoms, when laminated to nylon textile reinforcement and cured, provides a composite article in which the rubber adheres strongly to the nylon and has good physical properties.

The olefin copolymer rubber employed in the invention may be described as an essentially amorphous, random, elastomeric copolymer of two or more -alpha-monoolefins. with or without at least one copolymerizable polyene. Usually two monoolefins are used but three or more may be used. Ordinarily one of the alpha-monoolefins is ethylene while the other is preferably propylene. However, other alpha-monoolefins may be used including those of the formula $CH_2=CHR$ where R is an alkyl radical having for example 1 to 12 carbon atoms (e.g., butene-1, pentene-1, hexene-1, 4-methylpentene-1, 5-methylhexene-1, 4-ethylhexene-1, etc.). Preferably the copolymer includes a small amount of at least one copolymerizable polyene to confer unsaturation and sulfur-vulcanizability on the copolymer. Although conjugated dienes such as butadiene or isoprene may be used for this purpose (British patent No. 983,437; Belgian patent No. 736,717, Sumitomo Chemical Co., Jan. 29, 1970), in practice it is usual to employ a non-conjugated diene, including the open-chain non-conjugated diolefins such as 1,4-hexadiene (U.S. Pat. No. 2,933,480 Gresham et al., Apr. 19, 1960) or a cyclic diene, especially a bridged ring cyclic diene, as in dicyclopentadiene (U.S. Pat. No. 3,211,709, Adamek et cl., Oct. 12, 1965), or an alkylidenenorbornene as in methylenenorbornene or ethylidenenorbornene (U.S. Pat. No. 3,151,173, Nyce, Sept. 29, 1964), as well as cyclooctadiene, methyltetrahydroindene, etc. (see also such U.S. Pat. Nos. as 3,093,620 and 3,093,621; also 3,538,192. col. 6, line 49 to col. 7, line 51). Mixtures of polyenes (e.g., dicyclopentadiene plus ethylidenenorbornene) may be used. The polyenes employed are not limited to those having only two double bonds, but include those having three or more double bonds. More than one olefin copolymer rubber may be used.

For purposes of the invention the olefin copolymer rubber is employed in halogenated (e.g., chlorinated, brominated) form. This may be provided in known manner, for example by halogenating the olefin copolymer rubber, using halogen itself or an organic halogenating agent, in accordance with procedures described in the R. T. Morrissey article referred to above, or in U.S. Pat. No. 3,454,462, Hawley, July 8, 1969, or any other suitable conventional procedure. Preferred halogenating agents are the N-haloamides (including the N-halosulfonamides). A highly preferred method of providing the halogenated olefin copolymer rubber is to mix the rubber, for example on an open mill or in a Banbury mixer, with from 0.05 to 15 parts, preferably 0.1 to 10 parts, per 100 parts by weight of rubber, of an N-haloamide. The mixture is subjected to an elevated temperature, for example of about 200°–350°F., preferably 275°–300°F., usually for at least 1–5 minutes to effect the halogenation, and usually at the same time to blend in any desired fillers such as carbon black, silica, etc., extender oil, or other desired ingredients. After the halogenating step, the usual conventional curatives or vulcanizing ingredients may be blended in at a lower temperature in conventional amounts; for example, zinc oxide, sulfur or sulfur-yielding materials, accelerators of sulfur vulcanization, and the like may be added.

Among the N-haloamides useful for halogenating the olefin copolymer rubber, there may be mentioned by way of non-limiting example such chemicals as those of one of the following formulas I (the N-halomonoamide types), II (the N-halohydantoins), III (the N-halosuccinimide types), IV (the N-haloglycolurils), and V (trihaloisocyanuric acids):

I.  

wherein $R^1$ is for example selected from the group consisting of such bodies as aliphatic radicals having from 1 to 18 carbon atoms, preferably 1 to 8 carbon atoms (e.g., alkyl such as methyl, ethyl, hexyl, dodecyl, etc.), cycloaliphatic radicals having from 5 to 8 carbon atoms, preferably 6 carbon atoms (e.g., a cycloalkyl radical such as cyclohexyl), or aralkyl radicals having from 7 to 10 carbon atoms, $R^2$ is selected from such moieties as hydrogen (preferred), alkyl having from 1 to 10 carbon atoms (e.g., methyl, ethyl, decyl, etc.), cycloalkyl having for instance from 5 to 8 carbon atoms (e.g., cyclopentyl, cyclooctyl, etc.), and X is a halogen atom, frequently chlorine, bromine, or iodine;

II.  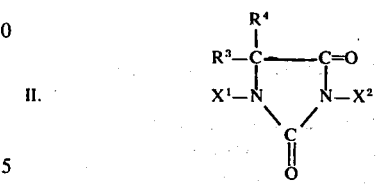

wherein $R^3$ and $R^4$ are the same or different and have for example the values previously assigned to $R^1$ in formula I above, or may be joined together to form for example a closed ring structure of from 5 to 7 carbon atoms (cyclohexyl, cyclopentyl, cycloheptyl), and $X^1$ and $X^2$ are the same or different and are preferably both halogen although one of them may be hydrogen if the other is halogen;

III. 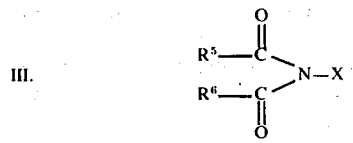

where $R^5$ and $R^6$ are the same or different and have for example the values previously assigned to $R^1$ in formula I above, or may be joined together to form an alkyl substituted or non-substituted aliphatic ring structure of, e.g., from 2 to 6 carbon atoms (for instance $R^5$ and $R^6$ may be alkylene of 1–4 carbon atoms [e.g., methylene] connected directly together or through a chain of 1 to 4 methylenes), or an alkyl substituted or non-substituted aromatic ring structure of, e.g., from 6 to 10 carbon atoms, and X is as previously defined in formula I above;

IV. 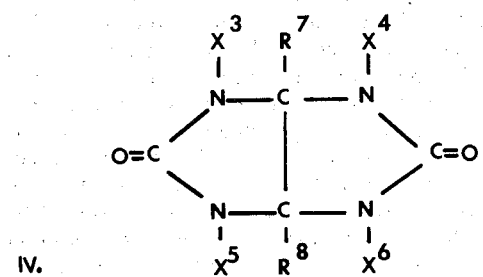

wherein $R^7$ and $R^8$ are the same or different and may have various values including hydrogen or those previously assigned to $R^1$ in formula I above, and $X^3$, $X^4$, $X^5$ and $X^6$ are the same or different and are preferably all halogens, although they may also be hydrogen provided that at least one of them is halogen; and V. 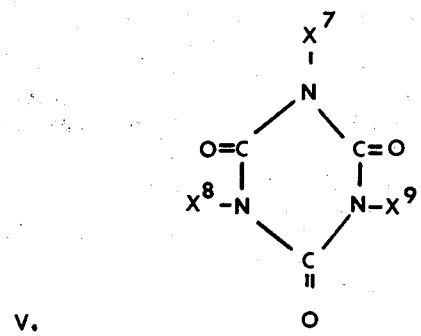

wherein $X^7$, $X^8$ and $X^9$ are the same or different halogen.

By way of illustrative specific examples of the N-haloamides there may be mentioned such compounds as N-chloroacetamide, N-bromopropionamide, N-iodovaleramide, N-chlorocaproamide, N-chloro-N-cyclohexylacetamide, N-bromo-N-cyclopentylcaprylamide, N-iodo-N-cyclohexylcapramide, also N-chlorocyclopentamide, N-chlorocyclohexamide, N-iodocyclooctamide, N-chloro-2-decahydronaphthamide, N-bromocyclohexactamide, N-chlorododecamide, N-bromotetradecamide, N-iodohexadecamide, N-chlorostearamide, N-bromostearamide, N-chlorobenzamide, 5-methyl-N-chlorohydantoin, 5-ethyl-N-bromohydantoin, 5-isopropyl-N-iodohydantoin, 5-hexyl-N-bromohydantoin, 5-cyclohexyl-N-chlorohydantoin, 5,5-diisopropyl-N-bromohydantoin, 5-methyl-5-isobutyl-N-iodohydantoin, 5-methyl-N,N-dichlorohydantoin, 5-ethyl-N,N-dibromohydantoin, 5-propyl-N,N-diodohydantoin, 5-isopropyl-N,N-dichlorohydantoin, 5-butyl-N,N-dichlorohydantoin, 5-isobutyl-N,N-diiodohydantoin, 5-pentyl-N,N-diodohydantoin, 5-hexyl-N,N-dibromohydantoin, 5-octyl-N,N-diiodohydantoin, 5-decyl-N,N-diiodohydantoin, 5-dodecyl-N,N-dibromohydantoin, 5-hexadecyl-N,N-diiodohydantoin, 5-stearyl-N,N-dichlorohydantoin, 5,5-dimethyl-N,N-dichlorohydantoin, 5,5-diethyl-N,N-dibromohydantoin, 5,5-di-n-propyl-N,N-dichlorohydantoin, 5,5-diisopropyl-N,N-dichlorohydantoin, 5,5-dibutyl-N,N-dibromohydantoin, 5,5-dipentyl-N,N-diiodohydantoin, 5,5-dihexyl-N,N-dichlorohydantoin, 5,5-diheptyl-N,N-dibromohydantoin, 5,5-dioctyl-N,N-diiodohydantoin, 5,5-didecyl-N,N-dibromohydantoin, 5,5-dicyclopentyl-N,N-diiodohydantoin, 5,5-dicyclohexyl-N,N-dichlorohydantoin, 5,5-dicyclooctyl-N,N-diiodohydantoin, 5-methyl-5-ethyl-N,N-dichlorohydantoin, 5-methyl-5-isopropyl-N,N-dibromohydantoin, 5-methyl-5-isobutyl-N,N-dichlorohydantoin, 5-methyl-5-pentyl-N,N-diiodohydantoin, 5-ethyl-5-propyl-N,N-dichlorohydantoin, 5-ethyl-5-isopropyl-N,N-dichlorohydantoin, 5-ethyl-5-isoamyl-N,N-dibromohydantoin, 5-ethyl-5-isooctyl-N,N-diiodohydrantoin, 5-propyl-5-butyl-N,N-dibromohydantoin, 5-isopropyl-5-isobutyl-N,N-diiodohydantoin, also 5-cyclopentyl-N,N-diiodohydantoin, 5-cyclohexyl-N,N-dichlorohydantoin, 5-cyclooctyl-N,N-dibromohydantoin, 5,5-dicyclohexyl-N,N-dibromohydantoin, 5-methyl-5-cyclohexyl-N,N-dichlorohydantoin, 5-ethyl-5-cyclohexyl-N,N-dibromohydantoin, 5-isopropyl-5-cyclohexyl-N,N-dichlorohydantoin, 5-octyl-5-cyclohexyl-N,N-diiodohydantoin, also spiro [cyclohexane-1,5'-N,N-dichlorohydantoin], N-acetyl-N-chloroacetamide, N-acetyl-N-bromopropionamide, N-propionyl-N-chloropropionamide, N-bromosuccinamide, N-chloroglutarimide, N-bromoadipimide, N-chlorophthalimide, N-bromophthalimide, 1,3,4,6-tetrabromoglycoluril, 1,3,4,6-tetrachloro-3a-methylglycoluril, 1,6-dibromo-3a,6a-dimethylglycoluril, 1,3,4,6-tetrabromo-3a-ethylglycoluril, 1,6-diiodo-3a-methyl-6a-ethylglycoluril, 1,3,4,6-tetrachloro-3a,6a-diisopropylglycoluril, 1,3-dichloro-3a,6a-dibutylglycoluril, 1,3,4,6-tetrabromo-3a,6a-dipentylglycoluril, 1,3-diiodo-3a,6a-dihexylglycoluril, 1,3,4,6-tetrachloro-3a,6a-dioctylglycoluril, 1,3-diiodo-3a-decylglycoluril, 1,3,4,6-tetrabromo-3a,6a-didodecylglycoluril, 1,3-diiodo- 3a,6-ditetradecylglycoluril, 1,3,4,6-tetrachloro-3a,6a-distearylglycoluril, 1,3,4,6-tetrachloro-3a-cyclopentylglycoluril, 1,4-dibromo-3a-cyclohexylglycoluril, 1,3,4,6-tetrachloro-3a,6a-dicyclohexylglycoluril, 1,3,4,6-tetrachloro-3a-methyl-6a-cyclohexylglycoluril, 1,3,4,6-tetrachloro-3a-stearyl-6a-cyclohexylglycoluril and others, tribromoisocyanuric acid, and the like.

The N-haloamide halogenating agents include also the N-halosulfonamides, such as those of the formula

Y[SO₂NX₂]ₙ where X is halogen (e.g., chlorine, bromine or iodine),
Y is phenyl, naphthyl, biphenyl or

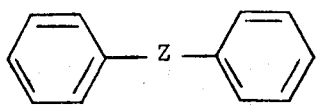

where Z is oxygen, sulfur, or alkylene or alkylidene having from 1 to 3 carbon atoms such as methylene, ethylene, propylene, isopropylene, ethylidene, propylidene and isopropylidene, and n has a value of 1 to 3. In the foregoing formula the Y group can be unsubstituted or can be substituted with alkyl (expecially lower, i.e., C₁ to C₈, alkyl) or aryl (especially phenyl) moieties. (See copending application Ser. No. 207,647, filed Dec. 15, 1971, Stephen E. Cantor, for a disclosure of the use of such chemicals, where n is 2 or 3, as vulcanizing agents.) Representative N-halosulfonamides include those having the following formulas:

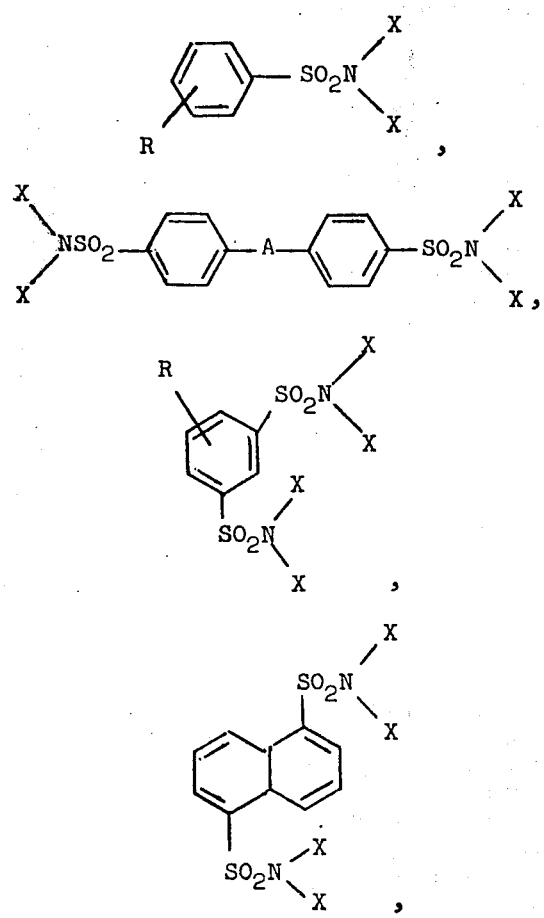

and

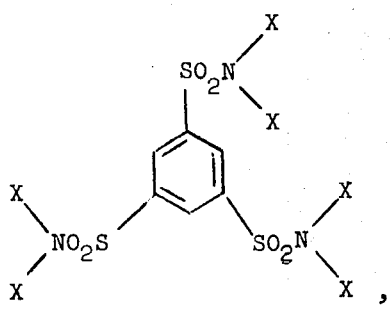

where X is halogen (e.g., chlorine, bromine or iodine), A may be zero (i.e., the biaryl group is biphenyl), oxygen (oxy-), sulfur (thio-) or methylene, and R represents hydrogen, alkyl (especially C₁ to C₈ lower alkyl) or aryl (especially phenyl) moieties.

Examples are N,N-dichloro-p-toluene sulfonamide, N,N,N',N'-tetrachloro-oxybis (benzenesulfonamide), N,N,N',N'-tetrabromooxy-bis(benzenesulfonamide), N,N,N',N'-tetrachloro-1,3-benzenedisulfonamide, and N,N,N',N'-tetrachloro-4,4'-biphenyl disulfonamide.

In accordance with the invention, the vulcanizable adhesive composition based on halogenated olefin copolymer rubber also has incorporated therein, as a resorcinol donor (also referred to as a methylene acceptor), a resorcinol-alkyl aldehyde condensation product in which the aldehyde has from 2 to 4 carbon atoms as described in the Paul patent referred to above. The Paul patent discloses (col. 2, lines 20–28; col. 3, lines 55–65) that the condensation product can be made by condensation, in alcoholic or aqueous medium in the presence of an acid catalyst at a temperature up to reflux temperature, of from one-half to one mole of the aldehyde per mole of resorcinol. Frequently from 0.2 to 10 parts, preferably 0.5 to 5 parts, of resorcinol-aldehyde condensate, per 100 parts by weight of olefin copolymer rubber, is added to the vulcanizable adhesive composition.

The adhesive composition containing halogenated olefin copolymer rubber, curative (usually not more than 3% of sulfur, based on the weight of the rubber), and resorcinol donor (along with any other desired ingredients such as fillers, extender oil, etc.) is thereafter laminated to the nylon textile and cured under conventional vulcanizing conditions. The nylon textile (synthetic linear polyamide, whether aliphatic [e.g., type 66] or aromatic [e.g., aramide]) may be in any suitable form, appropriate to the particular article being manufactured, for example a woven fabric in the case of air bags, a cord fabric in the case of pneumatic tires, or a braided fabric in the case of hose. The composition of the invention is preferably applied to the fabric by deposition from a cement, that is, a solution of the adhesive stock in an inert volatile organic solvent. The adhesive stock may also be applied in solid form, for example by calendering onto the fabric, or may be used in the form of a so-called tie gum.

The following example, in which all quantities are expressed by weight, will serve to illustrate the practice of the invention in more detail.

EXAMPLE I

A series of stocks are prepared by mixing 100 parts of an EPDM terpolymer rubber (61% ethylene, 35% propylene, 4% 5-ethylidene-2-norbornene, Mooney viscosity 60 ML-4-250°F.), 80 parts of fast extrusion furnace carbon black, 20 parts of silica (precipitated hydrated amorphous silica, "Silene D" [trademark]), 40 parts of extender oil (petroleum hydrocarbon oil of naphthenic type, "Tufflo 6204" [trademark]), and 3.5 parts of various organic halogenating agents, as follows:

Halogenating agent:
A 1,3-dichloro-5,5-dimethyl hydantoin
B tetrachloroglycoluril
C trichloroisocyanuric acid
D N,N-dichloro-p-toluene sulfonamide
E N-bromosuccinimide
(F none).

A control stock containing no halogenating agent is also prepared, for purposes of comparison. The foregoing ingredients are charged to a Banbury mixer, the ram is lowered, and the temperature is raised to 273°–300°F. for 1–2 minutes of residence time to decompose the halogen donor and halogenate the EPDM as well as to mix the materials efficiently. The masterbatch of halogenated EPDM thus obtained is cooled, and to each stock there is added zinc oxide (5 parts) and other standard curatives (3 parts of benzothiazyl disulfide, 0.7 part of tetramethyl thiuram disulfide, 1.5 parts of zinc dibutyl dithiocarbamate) and sulfur (1.2 parts). On each stock, Mooney viscosity (ML-4-212°F.) and scorch data (250°F.) are determined according to ASTM method D1646, and rheometer data (320°F., 1 minute preheat) are determined according to ASTM method D2084, with the results shown in Table I, wherein stocks A to E contain a halogenating agent as identified by the corresponding letter above, and stock F (which is outside the invention) is the control containing no halogenating agent. Table I also gives data on the physical properties of the stocks (unaged), press-cured for 30 minutes at 320°F.

Table I

Adhesion of EPDM Containing N-Haloamide and Resorcinol-Acetaldehyde Resin to Nylon Fabric

| Cement Stock: | A | B | C | D | E | F (control) |
|---|---|---|---|---|---|---|
| Adhesion after air cure 1 hour at 350°F.: | | | | | | |
| | 10 | 16.4 | 16.5 | 5.6 | 8.4 | 1 |
| Adhesion after air cure 2 hours at 350°F.: | | | | | | |
| | 10.8 | 19.6 | 21.0 | 8.4 | 8.0 | 1 |

180° Peel Adhesion at RT-Pull 12 inches/min - PPI

To make a coated nylon fabric suitable for manufacture of an air bag (passive passenger restraint for automotive vehicles), a plain weave greige nylon fabric, 5.7 ounces per square yard, made from 840 denier nylon 6 yarn, count 24 × 24, is coated on one side, by knife over roll coating, with the cement of the invention,

TABLE I

Properties of Stocks Containing Various Halogenating Agents

| Stock: | A | C | D | E | F |
|---|---|---|---|---|---|
| Mooney | | | | | |
| Viscosity | 103 | 126 | 117 | 104 | 115 |
| Scorch | 6'0" | 12'30" | 16'30" | 10'30" | 11'45" |
| Cure Rate | 21'0" | 12'30" | 11'30" | 7'30" | 11'0" |
| Rheometer | | | | | |
| Time to 95% optimum | 20'35" | 21'3" | 25' | 16'18" | 15'5" |
| Time to optimum | 40' | 44' | 50' | 50' | 40' |
| Physical Properties | | | | | |
| 100% modulus, psi | 830 | 720 | 715 | 645 | 705 |
| Tensile strength, psi | 2580 | 2540 | 2165 | 2215 | 2380 |
| Elongation, % | 325 | 310 | 325 | 380 | 305 |
| Hardness, Shore A | 72 | 65 | 69 | 68 | 67 |

Five adhesive cements of the invention are prepared by dissolving 100 grams of each stock A to E above, separately, in 350 gram portions of toluene, along with 1 gram of resorcinol-acetaldehyde resin (Example 1 of U.S. Pat. No. 3,266,970) dissolved in 25 grams of acetone. A control cement is similarly prepared from stock F. Adhesion to nylon is evaluated according to ASTM method D413. The adhesion test specimens are prepared by spreading the cements on one side of a strip of 5 oz. per square yard plain weave fabric made of nylon 66 yarn. The solvent is allowed to evaporate and the test strip is folded over onto itself (uncoated surface on the outside). A weight is placed on the sample to keep the cemented surfaces firmly in contact and the assembly is cured in air in an oven for 1 hour and for 2 hours at 350°F. after which the adhesion is measured at room temperature with the results given in Table II. The values given are 180° peel adhesion strengths, expressed in pounds per inch, obtained at a pull speed of 12 inches per minute. Table II shows the remarkable adhesion to nylon provided by cements A to E of the invention, in contrast to the control cement F.

which does not strike through. The solvent is evaporated by passing the coated fabric through a hot air circulating oven. The coating is then cured by passing through an oven heated to 350°F. for one hour. The thickness of the applied coating is approximately 5 mils. When fabricated into an air bag, the resulting article is strong and durable and there is no tendency for the coating to separate from the fabric during storage or use.

What is claimed is:

1. An adhesive composition, which adheres firmly to nylon fabric when vulcanized in contact therewith, comprising a mixture of
    A. a reaction product of an elastomeric terpolymer consisting of ethylene, propylene and a copolymerizable non-conjugated diene with from 0.05 to 15 parts, per 100 parts by weight of the said terpolymer, of an N-haloamide selected from the group consisting of N-halomonoamides of formula I, N-halohydantoins of formula II, N-halosuccinimides of formula III, N-haloglycolurils of formula IV and trihaloisocyanuric acids of formula V, as follows:

I. 

wherein $R^1$ is selected from the group consisting of alkyl having 1 to 8 carbon atoms and cycloalkyl having 5 to 8 carbon atoms, $R^2$ is selected from the group consisting of hydrogen, alkyl having 1 to 10 carbon atoms, aralkyl having 7 to 10 carbon atoms and cycloalkyl having 5 to 8 carbon atoms, and X is selected from the group consisting of chlorine, bromine and iodine;

II. 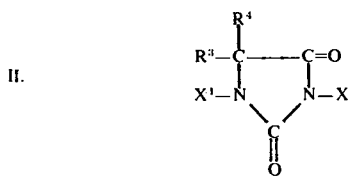

wherein $R^3$ and $R^4$ are the same or different and are as previously defined for $R^1$ in formula I, and $X^1$ and $X^2$ are the same or different and are selected from the group consisting of hydrogen and halogen provided that at least one of them is halogen, said halogen being selected from the group consisting of chlorine, bromine and iodine;

III. 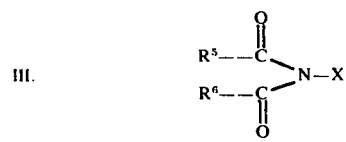

wherein $R^5$ and $R^6$ are the same or different and are as previously defined for $R^1$ in formula I, or may be alkylene having 1 to 4 carbon atoms joined directly together or through a chain of up to 4 methylene groups, and X is as previously defined for formula I;

IV. 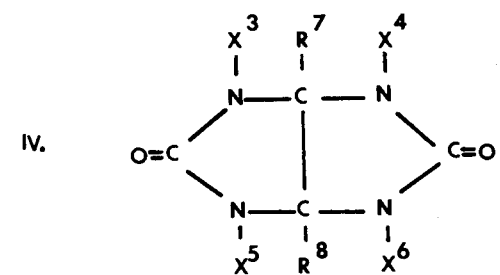

wherein $R^7$ and $R^8$ are the same or different and are hydrogen or as previously defined for $R^1$ in formula I, and $X^3$, $X^4$, $X^5$ and $X^6$ are the same or different and are selected from the group consisting of hydrogen and halogen provided that at least one of them is halogen, said halogen being selected from the group consisting of chlorine, bromine and iodine; and V. 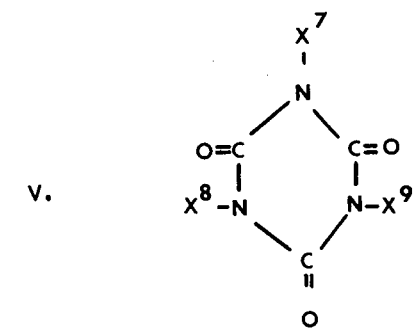

wherein $X^7$, $X^8$ and $X^9$ are the same or different and are halogen selected from the group consisting of chlorine, bromine and iodine, with (B) from 0.2 to 10 parts, per 100 parts by weight of the said terpolymer, of a resorcinol-alkyl aldehyde condensation product wherein the aldehyde contains from 2 to 4 carbon atoms, said condensation product being made by condensation, in alcoholic or aqueous medium in the presence of an acid catalyst at a temperature up to reflux temperature, of from ½ to 1 mole of said aldehyde per mole of resorcinol.

2. An adhesive composition as in claim 1 in which the resorcinol-alkyl aldehyde condensation product is resorcinol-acetaldehyde resin.

3. An adhesive composition as in claim 1, vulcanized with not more than 3% of sulfur, based on the weight of the said copolymer rubber.

4. An adhesive composition which adheres firmly to nylon fabric when vulcanized in contact therewith comprising, in admixture,
   a. an elastomeric terpolymer of ethylene, propylene, and a copolymerizable non-conjugated diene, said terpolymer being halogenated by heating in admixture with from 0.1 to 10 parts, per 100 parts by weight of the terpolymer, of an N-haloamide at a temperature of from 200° to 350°F. for a period of from 1 to 5 minutes to effect halogenation of the terpolymer;
   b. from 0.5 to 5 parts, per 100 parts by weight of the terpolymer, of a resorcinol-alkyl aldehyde condensation resin wherein the aldehyde contains from 2 to 4 carbon atoms, said condensation product being made by condensation, in alcoholic or aqueous medium in the presence of an acid catalyst at a temperature up to reflux temperature, of from ½ to 1 mole of said aldehyde per mole of resorcinol; and
   c. not more than 3 parts of sulfur, per 100 parts by weight of the terpolymer, as a curative for the said terpolymer.

5. An adhesive composition as in claim 4 wherein the said non-conjugated diene is 5-ethylidene-2-norbornene.

6. An adhesive composition as in claim 4 wherein the said N-haloamide is selected from the group consisting of
1,3-dichloro-5,5-dimethyl hydantoin
tetrachloroglycoluril
trichloroisocyanuric acid
N,N-dichloro-p-toluene sulfonamide,
and
N-bromosuccinimide.

7. An adhesive composition as in claim 4 in which the said resorcinol-alkyl aldehyde condensation resin is resorcinol-acetaldehyde resin.

8. An adhesive cement comprising an adhesive composition as in claim 4 dissolved in an inert volatile organic solvent.

* * * * *

UNITED STATES PATENT AND TRADEMARK OFFICE
CERTIFICATE OF CORRECTION

PATENT NO. : 3,932,559
DATED : Jan. 13, 1976
INVENTOR(S) : Stephen E. Cantor et al.

It is certified that error appears in the above-identified patent and that said Letters Patent are hereby corrected as shown below:

Column 9, line 15, on the right hand side of structural formula II, for "X" read --$X^2$--.

Signed and Sealed this

Tenth Day of August 1976

[SEAL]

Attest:

RUTH C. MASON
Attesting Officer

C. MARSHALL DANN
Commissioner of Patents and Trademarks